United States Patent [19]

Maier et al.

[11] Patent Number: 4,558,649
[45] Date of Patent: Dec. 17, 1985

[54] TABLE MADE UP OF A NUMBER OF PARTS, MORE ESPECIALLY A BENCH

[76] Inventors: Peter Maier, Gerokstrasse 1, D-7311 Neidlingen; Günther Arnold, Albstrasse 5, D-7441 Kohlberg, both of Fed. Rep. of Germany

[21] Appl. No.: 508,965

[22] Filed: Jun. 28, 1983

[30] Foreign Application Priority Data

Jul. 28, 1982 [DE] Fed. Rep. of Germany ....... 3228141

[51] Int. Cl.⁴ ............................................. A47B 3/06
[52] U.S. Cl. .................................... 108/159; 108/111; 144/286 R
[58] Field of Search ............... 108/156, 157; 248/188; 144/286 R, 1 R; 83/473, 477.2

[56] References Cited

U.S. PATENT DOCUMENTS 1,967,979  7/1934  Stern ................................. 108/159 X
3,664,274  5/1972  Bustos .............................. 108/111 X
3,734,151  5/1973  Skripsky ......................... 144/286 R
4,350,193  9/1982  McCambridge et al. ........... 108/159

Primary Examiner—Kenneth Downey
Attorney, Agent, or Firm—Flynn, Thiel, Boutell & Tanis

[57] ABSTRACT

The invention relates to a four-legged table having a table top formed by two spaced, parallel sections running in a first coordinate direction and having the same size as each other. Between these sections, which have a rectangular area in a plan view, and at a right angle thereto (that is to say running in a second coordinate direction), there are two further spaced parallel sections, which are of equal size and have a rectangular area. In the opening between the sections and filling up the same there is a bridge support placed between the sections and running in the two coordinate directions, the support resting on a step on the sections which is turned inwards and towards the table legs. Furthermore, the bridge support may be readily removed and its place taken by another form of support.

10 Claims, 4 Drawing Figures

TABLE MADE UP OF A NUMBER OF PARTS, MORE ESPECIALLY A BENCH

FIELD OF THE INVENTION

The present invention relates to tables made up of a number of parts, and more specially to such a table designed as a bench or table for use in trade or industry, having four table legs and a table top supported thereon.

BACKGROUND OF THE INVENTION

In civilized countries tables have come to be used on a very wide scale so that their design, function and different possible uses are quite well known. They are generally used as supports or rests for many different things and purposes and as a rule are made of such a height that a person in an upright or seated position may quickly and simply take up and put down the things on the table. The general design of a table is such that there is a table top and at least three or, as is most frequently the case, four table legs. There is a very wide range of different possible table sizes, the selection of the table size being dependent on the amount of free space in which the table may be put. For manufacturing a table, in the simplest case the first step is making a selection of the right size of table top and then fixing the legs thereto. But for some less common and somewhat complex designs of table, which make possible for the table top size to be changed after the table design has been completed, the size of the table top is fixed once and for all when the different parts of a table are put together. However in the general run of things, it is a shortcoming that before the size of a table top may be changed in a factory producing tables, a more or less complex process of retooling of the production machines is needed, this being more specially the case if extruding or injection molding machines are being used.

SUMMARY OF THE INVENTION

It is for these reasons that one purpose of the present invention is that of designing a table whose table top may be changed in size.

A still further purpose of the invention is that of producing a table that is low in price and may be used as a general purpose table, more specially for the machining of wood and resin material in connection with different electric tools such as a saw placed under the top face of the table, saws that are guided by means placed over the table, overhead milling cutters with a copying pin placed at a lower level, overhead millers cutting into the lower side of the work, grinding and polishing machines (that is to say belt sanders, angle sanders, plate sanders, porcupines or roller grinding machines), planes, wood turning systems, etc.

For effecting these and further purposes that will become clean on reading further parts of the instant account, the said top is formed by two spaced parallel first sections, running in a first coordinate direction, of the same size and having a rectangular area, two second spaced parallel sections of the same size and of equal rectangular area running in a second coordinate direction normal to the first sections between which they are placed, and a bridge support or flat bridge that is placed between the sections running in the two said directions and is bounded thereby, the said support being able to be removed or taken off so that a support of different size can be put in its place. One of the important useful effects of this table top of the present invention is that the table top may changed in size without changing the cross sectional areas of the sections running in the first and in the second directions by simply changing the length of each of these parts to be in line with what is needed. To keep to the same size of area, all that is necessary, more specially in the case of the manufacturing processes in which the sections are made by drawing, as for example by extursion or injection molding, is for the separate sections to be cut off to the desired length so as to be longer or shorter without any other changes in the design. This being the case, it is best for the said sections running in the first and second directions to be made of extrusions. This goes for the bridge support as well if it is in the form of a section. If this is not to be the case, then the bridge sport itself has to be changed in size, more specially in the case of certain forms of the invention of which more details will be given later herein.

One material that has specially useful properties for extrusion is aluminum. This material is highly useful inasfar as on one hand it is very simply machined while on the other hand the finished product is light in weight so that the table is more readily handled.

As a further part of the general teaching of the present invention the bridge support is temporarily fixed in position so that it may be replaced by another one when desired. There are a number of different ways in the present invention for making this possible. One way, that is more specially of value, is one in which the sections running in the first direction of the table are molded on the inner side which faces the bridge support with a step running all the way along the length of the sections, so that the bridge support or support board may locked in position quite simply by placing it on the lower part of the table or frame with the legs. Furthermore the bridge support may then be used for supporting heavier weights without going past the load carrying capacity of the material. The fact that the bridge support is only temporarily fixed in place gives a further useful effect when it comes to using the table as a carpenter's or mechanic's bench for a number of different tools such as circular saws, keyhole saws, overhead millers, saws placed under the table, and planers, inasfar as in such cases, as for example in the case of overhead millers, the supporting table top has to be free of openings, while on the other hand in the case of a circular or other form of saw under the table the bridge support has to have an opening or a slot, which is best placed running in the length direction of the table, for the tool. In this case for a changeover it is only necessary for the bridge support to be lifted up out of the way and a different size of bridge support to be put in its place. On using tools sticking through openings in the bridge support it is best for the opening in each case to be made as small as possible without however being so small as to be in the way of the tool.

In keeping with a further useful development of the present invention the table or bench top is so designed that its top face os lined up with the faces of the sections running in the said first and second directions. The outcome is then a table top with a generally plane or flat and flush top face so that working with the table becomes very simple.

One material that may be used for the table or bench top is steel sheet or injection cast material or extruded aluminum, such metal then more specially offering the highly useful effect, as noted hereinbefore, of making it simple for the bridge supports, like the sections running in the said first and second directions, to be simply produced to different sizes.

As part of a still further outgrowth of the general teaching of the present invention, the sections running in the first and/or the second directions are locked to the table legs, that is to say joined therewith by positively interlocking parts. As has been seen in the development of the present invention this may be done by having, for example, grooves molded on the table legs to take up pins on the sections running in the first and/or second sections. Such interfitting of the parts that are to be joined together makes the table very much stronger.

The same sort of effect may be produced if the table legs are placed at an obtuse angle to the table top. In the present invention this angle is to be that angle which is between the table legs and the middle point of the bridge support so that in fact the table legs will be running outwards in a downward direction from the bridge support and the table then is more stable.

As a further development of the invention the table legs have teeth for decreasing the danger of slipping and/or have hinge joints for making transporting and/or storing the table simpler.

As a last point, a material that is specially low in price for making the table legs is pressure cast metal.

In the account now to be presented a number of different froms of the invention will be detailed using the figures.

DETAILED DESCRIPTIONED

Figure 1:
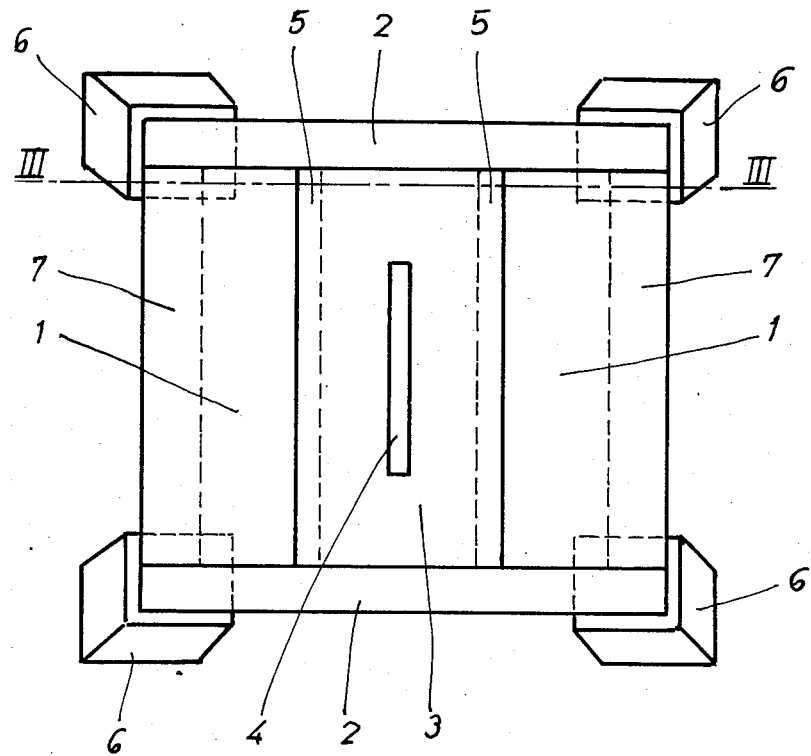
FIG. 1 is a plan view of a table or workbench embodying the present invention.

In FIG. 1 the reader will see spaced sections 1 or bars having a rectangular shape and being the same in size, the sections 1 stretching in a first or lengthways direction and having their ends resting head on against the sides of two sections 2 or bars which each have a rectangular shape and which are the same in size, such second sections running in a second direction normal to the first direction. Between the first sections 1 and the second sectiosn 2 a cover or bridge support 3 is fitted in place, the two first sections 1 and the two second sections together forming a rectangular and in fact almost square table top.

In the middle the bridge support has a slot 4 running in the first direction to take up the blade of a tool such as the blade of a circular or keyhole saw. As is more specially to be seen from FIGS. 3 and 4 and as is marked in broken lines in FIGS. 3 and 4, the support 3 is supported on inwardly running ledges or steps 5 on inner sides of the first sections 1. The support plate 3 is then kept in position by its own weight or by screws and because of the generally large ledges or steps 5 is able to support great weights.

At the corners of the table top which is formed by the first sections 1, the second sections 2 and the support 3, table legs 6 are fixed in position in such a way that they are at an obtuse angle to the table top 3. Having the table legs at a slope makes the table more stable so that it is not so likely to be pushed over by forces acting horizontally on the table top. In the present working example of the invention it will be seen that the table legs 6 extend out past the edge of the table top as formed by the first sections 1 and the second sections 12.

Lastly it will be seen that on the lower side of the first sections 1 at the outer edge there is a downwardly projecting wall 7 stretching all the way along the length thereof, on which the table legs 6 are fixed at least in part.

The present form of the invention has a great number of useful effects. On the one hand it is possible for tables of different sizes to be produced with only a little re-tooling, for example simply by using support plates that are different in breadth or length while using the first sections, the second sections and possibly the support plate with a different length, but without changing the cross section thereof. It is more specially in the case of parts produced by drawing that a change in the length of the parts of the table does not make necessary any change in the production machines. There is as well a further useful effect to be had from the form of the invention inasfar as the parts may be simply lifted out of position and other ones put in their place for making changes in the form of the table.

Figure 2:
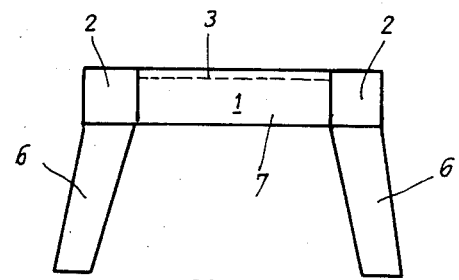
FIG. 2 is a side view of a further table embodying the invention.

In FIG. 2 a working example on generally the same lines as in FIG. 1 is to be seen in a side view. In this case the greater part of the end face of the support plate is shown, so that the direction of viewing would be from the right or the left in a view similar to FIG. 1. In the side view of FIG. 2 the reader will for this reason be able to see one of the two first sections 1 whose ends butt against the two second sections 2, whose end faces only can be seen. A table leg 6 is fixed to these parts so as to be running downwards at a slope, that is to say so as to make an obtuse angle with the table top. In the present view one first section will be seen with its wall 7. In this respect the thickness of the first section 1, taking into account the wall 7, is eqal to the breadth of the generally square-section second section 2. It breadth is again, unlike th form to be seen in FIG. 1, generally equal to the breadth of a table leg 6. Near the top of one of the first sections 1 a broken line has been marked parallel to the edge to make clear the position of the bridge board 3 which is behind the section 1.

Figure 3:
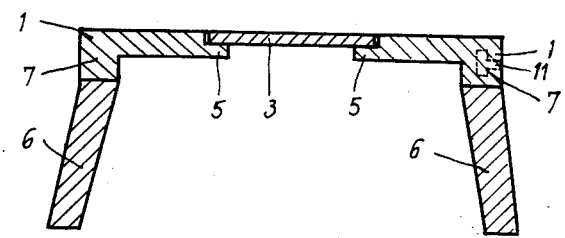
FIG. 3 is a sectional view of the table of FIG. 1, the section being taken on the line III—III.

FIG. 3 is a section taken on the line III—III of the form of the invention to be seen in FIG. 1, which will be seen to have two first sections 1, at whose inner edges there are steps or ledges 5. These are used for supporting a bridge board 3 of the right size for fitting in place. The thickness of the board is preferably such that its top face is fully on the same level and flush with the top faces of the first sections 1. The first sections, namely the sections running in the first said direction or coordinate, have towards their loer face and on their outer edges a head 7 for connection with the table legs 6. In this case as well, unlike the form of FIG. 1, the thickness of the head 7 is made equal to the thickness of the table leg 6 so that the tops of the table legs are flush with the upper part of the table and are not sticking out beyond it as in FIG. 1.

Figure 4:
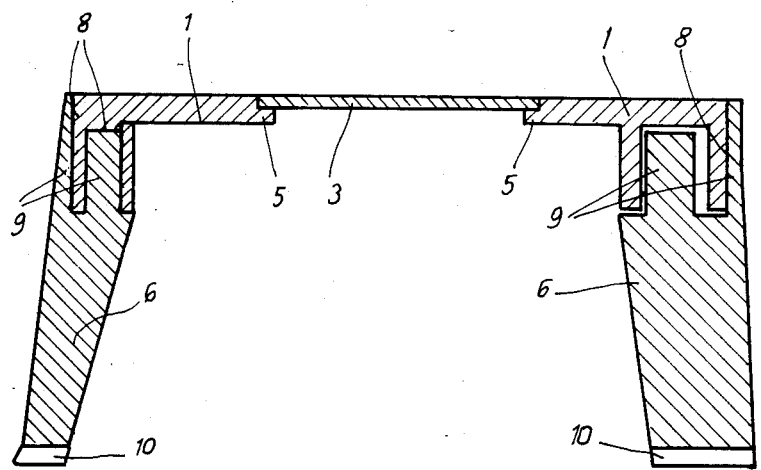
FIG. 4 is a sectional view similar to FIG. 3 but of a structure with a different way of fixing the table legs in position.

The table design to be seen in FIG. 4 is in many details the same as that of FIG. 3. However the important difference is to be seen in the way the first sections 1 are secured to the legs 6 of the table. In fact, to this end the first sections 1 and their heads 7 have a middle groove and a further groove 8 on the edge to take up pins 9 of opposite or mating form on the table legs 6. In this way one may be certain of a specially tightly fitting joint between the table legs 6 and the sections 1 running in the first direction, that is to say with the table top. Lastly the design is different inasfar as the table legs 6 each have one tooth 10 at their lower ends for stopping them from slipping on the floor.

In the case of a further possible form of the table, not shown, there are pins on the sections running in the lengthways and/or transverse directions, such pins fitting into grooves in the legs of the table.

It is possible for the table frame made up of two pairs of extrusions or sections 1 and 2 of aluminum for example to have side grooves possibly running all the way round the table frame. Such grooves 11 are best made with a section like that of a letter T or with a dovetail form so that they may be used for guiding and fixing stops and wings on the table for increasing the size thereof. Such grooves are produced in the sections when same are extruded.

The embodiments of the invention in which an exclusive property or privilege is claimed are defined as follows:

1. A work table, comprising four table legs and a table top supported by said table legs, said table top having an opening therein in which a changing plate can be removably supported so that an upper side of said changing plate is substantially flush with an upper side of said table top, wherein said table top includes two first sections of the same size which each have a rectangular upper surface, which are spaced from one another, and which extend parallel to one another, and includes two second sections of the same size which each have a rectangular upper surface, which are spaced from one another, and which extend peripendicular to said first sections, said opening being between said first sections and between said second sections; wherein edges of said first sections which are adjacent said changing plate have steps thereon which support said changing plate between said second sections; wherein one of said first sections and said legs have grooves therein and the other thereof have pins receivable in said grooves, said pins and grooves defining a plug connection which releasably connects each said leg to said table top; and wherein said table legs each form an obtuse angle with respect to said table top.

2. The work table as claimed in claim 1, wherein said changing plate has means defining an opening therein.

3. The work table as claimed in claim 2, wherein said opening in said changing plate is a slot.

4. The work table as claimed in claim 1, wherein said first and second sections each have an outwardly open side groove provided in and extending the entire length of an outer edge portion thereof.

5. The work table as claimed in claim 4, wherein each said side goove has a T-shaped cross-section.

6. The work table as claimed in claim 5, wherein said legs have teeth at lower ends thereof for biting into the material of a floor on which said work table is supported.

7. The work table as claimed in claim 1, wherein said first and second sections are each an aluminum extrusion; wherein said changing plate is one of a steel plate, an aluminum extrusion, and a die cast metal part; and wherein said table legs are each a die cast metal part.

8. The work table as claimed in claim 5, wherein each said first section is disposed between and has an end which butts against said second sections.

9. The work table as claimed in claim 8, wherein said opening in said table top is rectangular, and wherein said changing plate is rectangular and of substantially the same size as said opening in said table top.

10. The work table as claimed in claim 1, wherein said second sections are free of structure for supporting said changing plate, said changing plate being supported entirely by said steps on said first sections.

* * * * *